Sept. 1, 1964  D. A. MAHLSTEDT ETAL  3,146,788
TIME CONTROL BRINE REFILL SYSTEM
Filed Sept. 7, 1961  2 Sheets-Sheet 1
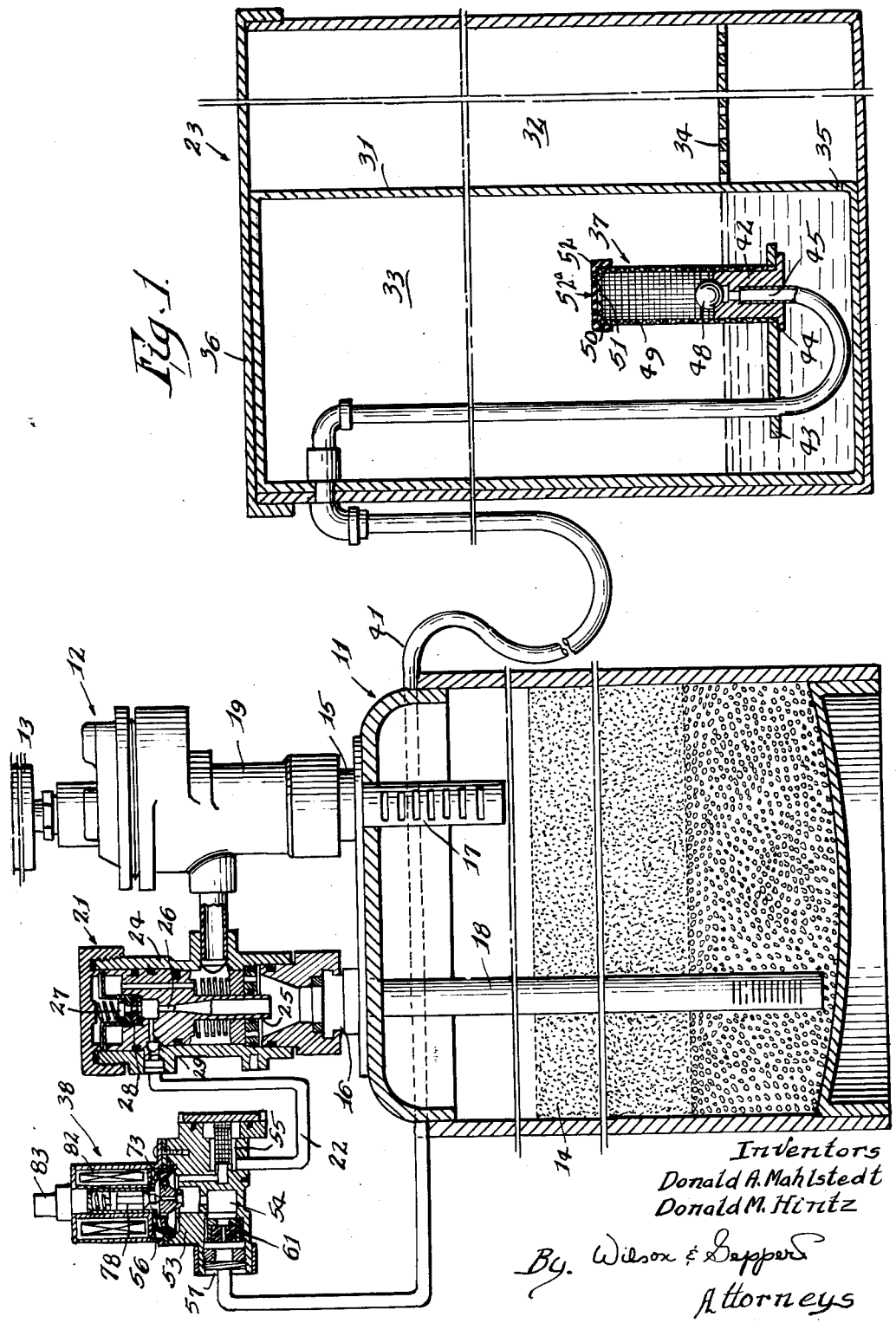
Inventors
Donald A. Mahlstedt
Donald M. Hintz
By Wilson & Dapper
Attorneys

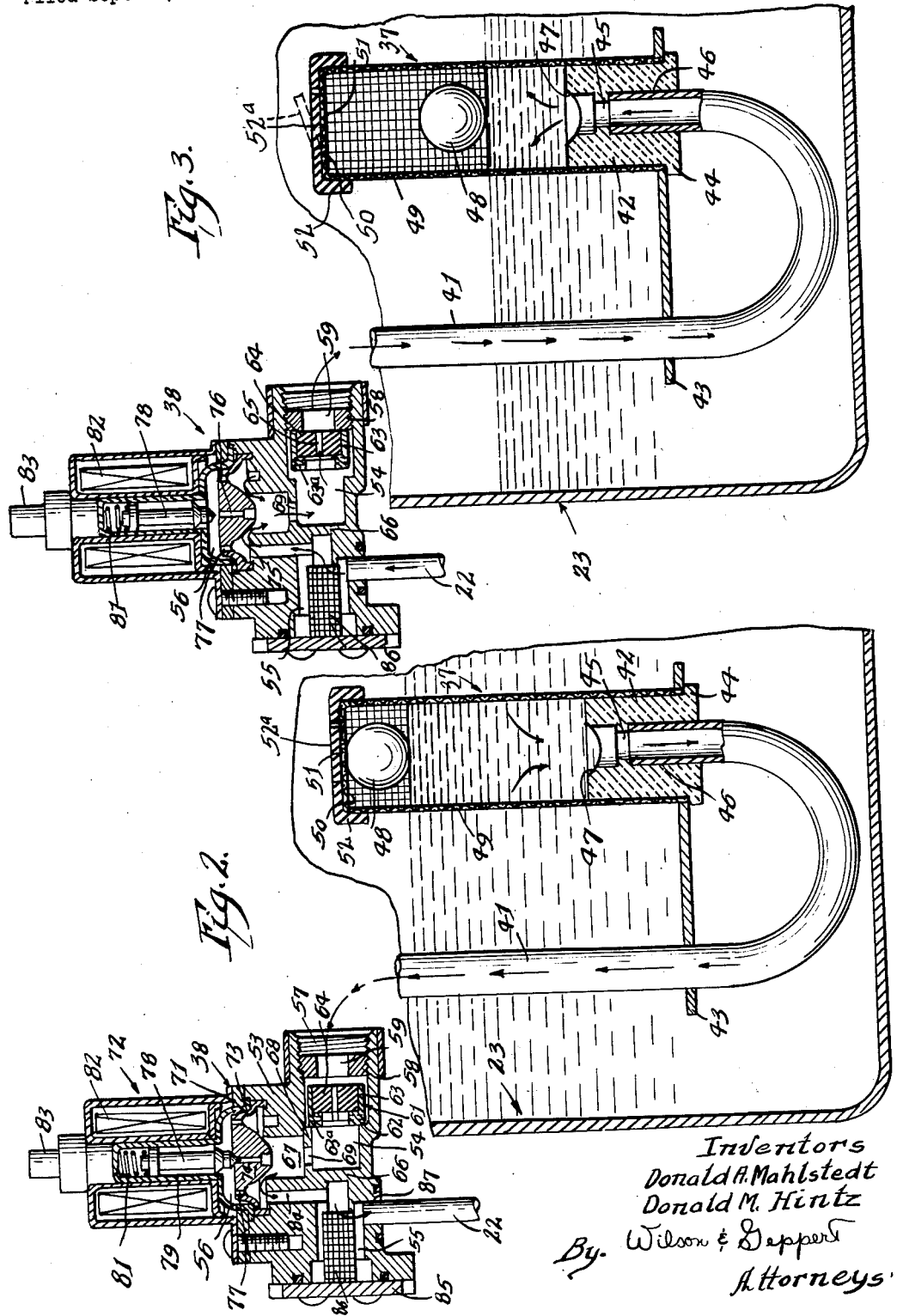

United States Patent Office 3,146,788
Patented Sept. 1, 1964

3,146,788
TIME CONTROL BRINE REFILL SYSTEM
Donald Arthur Mahlstedt, Deerfield, and Donald M. Hintz, Northbrook, Ill., assignors to Culligan, Inc., Northbrook, Ill., a corporation of Delaware
Filed Sept. 7, 1961, Ser. No. 136,556
8 Claims. (Cl. 137—399)

The present invention relates to a novel timed refill system for use in a chemical solution tank and more particularly to an accurate variable refill and withdrawal system for a brine tank used in conjunction with a water softener or conditioner.

In the operation of water softeners or conditioners, the active minerals or water treating material in the tank or container become exhausted and require periodic regeneration or rejuvenation. When exhausted, the minerals may be regenerated with a suitable regenerant, such as sodium chloride, either by adding the salt directly to the contents of the softener tank and rinsing it through with water, or by preparing salt brine in a separate tank or container and causing this regenerant to be drawn into the softener tank and subsequently rinsed therefrom.

In the operation of a brine tank for supplying regenerant to water softeners, a suitable valve arrangement must be provided to control the flow and amount of brine conducted to the softener tank since most of such brine tanks are capable of holding salt sufficient for plural regenerations. Where an automatic softener system is utilized, it is essential that the valve assembly permits fresh water to return to the brine tank after regeneration has been completed and thereby replace the water removed therefrom as brine or regenerant.

In prior brine valve assemblies, it has been determined that the usual float controls are not reliable, the buoyancy of the float being usually insufficient for positive valve action and the accuracy of the level control is unsatisfactory, accuracy depending upon the type of salt employed in the brine tank. Further, the brine withdrawn from the brine tank is dependent not only on the float level but also upon the void volume between the solid salt particles, for as the salt particles dissolve the void volume changes and any caking of the semi-wet salt causes considerable variation in void volume which in turn results in a substantial variation in salt dosage.

In the present invention, salt dosage for a regeneration operation is controlled independently of void volume with the refill volume for the brine tank being accurately and positively controlled. It provides for accuracies at a given water volume as exacting as ±0.04 pound of salt regardless of the type of salt used.

An important object of the present invention is the provision of a time actuated valve assembly to effect a timed refill of fresh water to a chemical solution tank. Timed filling adds an exact volume of water based on the flow rate and total time elapsed. Since the volume of water can be exactly determined, any variation in the void volume of the salt or other chemical used will not affect the volume or density of the resultant brine or other chemical solution.

Another object of the present invention is the provision of a positive shut-off of the refill assembly to the brine tank during the service operation. This positive shut-off minimizes the possibility of overflow of the brine tank.

A further object of the present invention is the provision of a refill system which can be easily adjusted to vary the total fill volume. By varying the total fill volume, this can be translated into variation in salt dosage for the regeneration of a water softener, thus providing an easily adjustable salt setting means. This adjustment is effected by lengthening or shortening the time interval where water is permitted to flow into the brine tank.

The present invention comprehends a novel valve arrangement in the brine tank whereby air binding resulting in early seating of an air check valve is effectively eliminated and positive control of the valve is assured.

The present invention further comprehends a variable flow control in the time controlled valve assembly which effectively allows a constant rate of flow of water into the brine tank even though the water pressure may fluctuate during the refill interval.

The present invention also comprehends the provision of a brine refill system including a novel air check valve in the bottom of the brine tank and a time controlled solenoid actuated valve communicating therewith. The valve assembly has a solenoid actuated diaphragm to control flow therethrough and a variable flow control to retain a constant rate of flow under varying fluid pressure conditions.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a view in front elevation of the apparatus of an automatic water softener or conditioning apparatus embodying the present invention of a novel time control brine refill system in the brine tank of the apparatus, the brine tank, refill system and eductor on the automatic water softener being shown in vertical cross section.

FIG. 2 is a fragmentary view of the refill system in vertical cross section with the component parts shown in the position they occupy during a regeneration operation.

FIG. 3 is a fragmentary view of the refill system in vertical cross section similar to FIG. 2 but with the component parts shown in their refill positions.

Referring to the disclosure in the drawings wherein is shown a novel illustrative embodiment of the present refill system for controlling salt dosage for the regeneration of a water softener or conditioner 11 having an automatic valve mechanism designated generally by the reference character 12. The operation of the control mechanism is initiated by a suitable timer 13 for the regeneration of the active ingredients 14 in the tank 11 at a designated time period (FIG. 1).

While regeneration is automatically effected in the home, the softener tank 11 is shown as being of the service type in that it may be readily disconnected from the automatic control mechanism 12 and bodily removed when necessary for regeneration or removal of the active ingredients 14 or other treating procedures. The tank is shown with suitable fittings 15 and 16, one of which is connected to a readily removable inlet manifold 17 and the other to a depending outlet manifold 18.

The automatic control mechanism 12 has two separate bodies connected by a short conduit. One of the bodies 19 houses a directional valve unit communicating with the inlet manifold 17, while the other body houses an eductor unit 21 which draws brine for the regeneration cycle through a conduit 22 from a brine tank 23. The eductor unit 21 has an eductor housing 24 having a depending tubular part 25 providing a throat or passage 26 for the eductor. The housing 24 has an opening 27 communicating with the passage 26 with a flow control 28 within the opening. A passage 29 communicates with the throat or passage 26 and with the conduit 22 leading to the brine tank. This automatic control mechanism is more fully shown in the copending application of Robert E. Schulze et al., Serial No. 731,359, filed April 28, 1958, now Patent No. 3,006,376. Since other automatic valves may be utilized with this brine refill system, only the pertinent portions of the eductor 21 have been disclosed.

The brine tank 23 can be of any construction where the storage of the salt is separate from the sump or collector for the saturated brine. The tank illustrated has a partition 31 dividing the tank into two chambers 32 and 33. The chamber 32 has a perforated plate 34 horizontally mounted near the bottom of the chamber; the plate supporting the salt stored in any desired form within the chamber. The second chamber 33 is the brine storage and supply chamber and communicates with the salt storage chamber 32 through one or more openings 35 in the partition 31 below the level of the perforated plate 34. The tank has a removable cover 36 to gain access to the salt storage for replenishing the supply of salt therein.

Within the brine storage and supply chamber 33 is located the air check valve assembly 37 of the brine refill system. This valve is connected to the refill control valve 38 secured to the automatic valve mechanism 12 by a plastic conduit 41. The air check valve is located adjacent the bottom of the chamber 33 with the resilient base 42 impressed in a plate 43. The base is preferably composed of natural or compounded synthetic rubber or other resilient plastic and has a radial flange 44 to locate the base in the plate 43 and a central passage 45. The passage 45 is counterbored at 46 at its lower end to conformably receive an end of the conduit 41, which though normally straight, will be bent at its lower end into a U-shape and anchored in the plate 43 and base 42 to prevent straightening to its original form.

The upper end of the passage 45 is flared outwardly to form a valve seat 47 for a buoyant ball valve 48. A cylindrical screen cage 49 forms a chamber for the ball valve and conformably fits over the exterior of the resilient base 42 and abuts the radial flange 44. The cage 49 has a screen top 50 to prevent the ball valve from escaping, but an opening 51 is centrally located in the top for a purpose to be later described. A rubber check valve 52 in the form of a cap with a central relatively thin rubber flap 52a is secured to the top of the cage 49 with the flap aligned with the opening 51.

Adjacent the eductor 21 is positioned the brine refill control valve 38 which includes a valve body 53 with a pair of longitudinally extending chambers 54 and 55 and a laterally offset diaphragm chamber 56 (FIG. 1). The valve body 53 has an opening 57 which receives the other end of the conduit 41. A flange or wall 58 defining an opening 59 is located in the chamber 53 to define an area containing a reciprocal flow controller 61. The wall or flange 58 limits movement of the flow controller 61 toward the opening 57 and an inwardly extending shoulder 62 limits movement in the opposite direction. The flow controller 61 consists of a skeleton frame or spider 63 within which is housed a resilient flow control member 64 having a central passage 65. The spider 63 extends beyond the flow control member 64 in one direction to prevent engagement of the member 64 with the shoulder 62 (FIG. 2) and is flush with the opposite end of the member 64 to allow engagement of the resilient member 64 with the wall 58 (FIG. 3); the spider having radial passages 63a in the portion extending beyond the flow control member for liquid flow in the position shown in FIG. 2.

The chamber 54 is separated from the chamber 55 by a vertical wall 66 extending upwardly and forming a cylindrical entrance 67 into the diaphragm chamber 56. The lower end of the entrance 67 is defined by a wall 68 having an opening 69 communicating with the chamber 53. The diaphragm chamber 56 is defined by the valve body 53 and a cap 71 secured to the body 53 and containing a solenoid valve 72. A diaphragm 73 having a central thicker area 74 is secured at its peripheral edge between the valve body 53 and its cap 71 with the thicker central portion 74 of the diaphragm 73 normally seating on the open end 75 of the cylindrical entrance 67 and partially extending into the entrance.

As more clearly shown in FIGS. 2 and 3, the diaphragm has a central stepped passage 76 extending through the central thicker area 74 and one or more bleed openings 77 in the web of the diaphragm. A valve member 78 extending into the chamber 56 from an encompassing passage 79 in the cap 71 has a conical or pointed end which seats in the passage 76 in the diaphragm to control the pressures exerted on both sides of the diaphragm. The valve member 78 is normally biased into the chamber 56 by an expansion spring 81 in the passage 79. A solenoid coil 82 surrounds the passage 79 and when energized lifts the valve member 78 against the pressure of the spring 81 to open the passage 76 through the diaphragm. The solenoid coil 82 is controlled by an automatic reset timer 83 separate from but interconnected with the timer 13.

Surrounding the cylindrical entrance 67 is an annular passage 84 communicating with the chamber 56 and leading to the chamber 55. An end plate 85 closes the open end of the chamber 55 to direct flow through a cylindrical screen 86 and out a laterally extending port 87 to the conduit 22 attached to this port to provide flow to the eductor 21.

To fully understand the operation of the brine refill system, a cycle of operation is described. During the normal service operation of the water softener or conditioner, the refill operation occurs at the beginning since liquid to be softened or conditioned enters the valve body 19, passes through the inlet manifold 17, down through the active ingredients 14, upward through the outlet manifold 18 into the eductor housing, and generally passes through an outlet port to service, but liquid can pass upward through the throat or passage 26 and the passage 29 to the conduit 22 and the brine tank 23. When the previous regeneration cycle ends, the timer 14 signals the timer 83 to energize the solenoid coil 82 for a predetermined time interval which is obtained through well-known means such as an adjustable cam and switch (not shown).

Energization of the solenoid coil 82 lifts the valve member 78 against the force of the spring 81 to unblock the passage 76 in the diaphragm 73 to allow flow of liquid from the conduit 22 into the chamber 54 and annular passage 84, through the bleed holes 77 and out the central passage 76 (FIG. 3). Since the pressure drop at the bleed holes 77 is greater than the pressure drop at the central passage 76, a reduced pressure is created above the diaphragm 73 to lift it off of the seat at the open end 75 of the cylindrical entrance 67 and allow flow from the annular passage 84 directly to the chamber 55. The flow of liquid moves the flow control member 64 against the wall or flange 58 so that flow can only occur through the passage 65 in the resilient member 64.

This flow control is variable depending on the pressure of the liquid passing therethrough to produce a constant liquid flow rate through the valve. As the liquid pressure increases, pressure is exerted on the exposed face and sides of the resilient flow control 64, and the cross-sectional area of its passage 65 is decreased so that constant flow occurs under a wide range of pressures.

From the chamber 55, the liquid flows through the conduit 41 into the passage 45 of the base 42 of the air check valve 39. The buoyant ball valve 48 is lifted off of its valve seat 47 and liquid flows through the cage 49 into the chamber 33 and into chamber 32 to contact the salt and form brine. The liquid flow continues until the solenoid coil 82 is deenergized, at which time the valve member 78 is urged downward and closes the passage 76, and the diaphragm 73 seats on the open end 75 of the cylindrical entrance 67. The valve 38 remains in this position until the next regeneration cycle occurs.

The screen cage 49 serves a dual purpose of retaining the ball valve 48 and preventing impurities from entering the eductor system with the brine. The opening 52 in the top of the cage 49 prevents preseating of the ball valve during eduction due to air entrapped in the cage.

The screen for the cage 49 is of a mesh which will not allow the passage of air therethrough and, as fresh water enters the brine tank, air coming out of solution would be trapped within the cage. If a sufficient amount of air comes out of solution the ball valve 48 is lowered by the tendency of the air to rise to the top 51 of the screen cage to a point immediately above the valve seat 47, so when brine is educted, the ball valve will preseat before the total amount of brine has been withdrawn. By placing the opening 51 in the top 50 of the cage, the air collecting within the cage can escape through this opening and through the rubber check valve 52 by lowering the ball valve to gain access to the opening. The thin flap prevents any impurities from being drawn through the opening 51 during the regeneration operation. A coarse screen could be used for the cage 49 so that the air would escape through the screen mesh, but this would defeat the purpose of the cage to screen out impurities which could cause malfunction in the system.

When the water softener has exhausted the treating characteristics of the active ingredients 14, the timer 13 will operate the automatic valve mechanism 12 to provide for a regeneration cycle. Liquid enters the eductor 21 from a hard water supply line via the directional valve unit 19, and passes through the opening 27 and flow control 28 and down through the throat or passage 26 to the outlet manifold in the tank. The liquid passing through the throat 26 creates a partial vacuum in the passage 29, the conduit 22, the valve chamber 55 and the annular passage 84. The suction is also present in the bleed holes 77 and the chamber 56 above the diaphragm 73 creating a negative pressure therein. Since atmospheric pressure is acting on the underside of the central diaphragm area 74, the diaphragm tends to lift up thereby connecting the conduit 41 from the brine storage chamber 33 with the conduit 22 leading to the eductor. The suction draws brine from the chamber 33 through the screen cage 49 and past the ball valve 48 into the passage 45 and through the conduit 41 to the valve 38.

The ball valve 48 remains in a floating position until the level of the brine in the chambers 32 and 33 coincides with the top of the valve seat 47 in the base 42. Then the ball valve 48 seats upon the valve seat 47 to prevent any air from being educted through the system. When the brine flow begins in the valve 38, the flow controller 61 is shifted until the end of the spider 63 abuts the flange 62, and brine flows around the resilient flow control 64 due to the open framework of the spider 63, through the radial passages 63a and into the cylindrical entrance 67. From there the brine flows between the diaphragm 73 and the open end 75 to the annular passage 84 and thence to the conduit 22 and the eductor 21. The saturated brine enters adjacent the throat 26 and mixes with the liquid flow to provide a diluted brine for efficient regeneration of the active ingredients 14.

When the regeneration operation has been completed, the timer 13 actuates the valve mechanism 12 to service operation and signals the timer 83 to begin another refill operation. While a particular automatic valve mechanism and brine tank have been shown and described in connection with the brine refill system, other automatic valves containing eductor units and other brine tanks may be utilized. While the improvement has been shown and described as being advantageously applicable to water softening or conditioning equipment, it is not our desire or intent to unnecessarily limit the scope or the utility of the improved features by virtue of this illustrative embodiment.

Having disclosed the invention, we claim:

1. A chemical solution withdrawal and refill system for a solution tank, comprising a control valve and an air check valve connected by a conduit, and a source of liquid pressure and suction communicating with said control valve, said air check valve including a base, a cage, and a ball valve within said cage and controlling communication between said cage and said conduit, said control valve including separated inlets for said conduit and said source of liquid pressure and suction, a chamber communicating with said separated inlets, a diaphragm in said chamber controlling flow between said inlets, a solenoid operated valve biased against said diaphragm, and means to actuate said valve for a timed interval for the refilling of the solution tank.

2. A chemical solution withdrawal and refill system for a solution tank, comprising a control valve, a source of liquid pressure and suction communicating with said valve, an air check valve, and a conduit connecting said valves, said control valve including a first chamber communicating with said source of liquid pressure and suction, a second chamber communicating with said conduit, a third chamber communicating with said first and second chambers, a diaphragm in said third chamber normally preventing communication between said first and second chambers, a solenoid actuated valve controlling actuation of said diaphragm for refilling the system, said diaphragm including a web portion and a central area of greater thickness, said central area having a central passage controlled by said solenoid actuated valve, and said web portion having one or more bleed openings, and a reciprocable flow control member in said second chamber, said air check valve including a valve seat having a passage communicating with said conduit, a cylindrical screen cage surrounding and extending above said valve seat, a screen top integral with said screen cage and having a central opening, and a ball valve in said screen cage which is larger than said opening.

3. A chemical solution withdrawal and refill system as set forth in claim 2, including means to withdraw the solenoid actuated valve for a predetermined time interval allowing liquid from said first chamber to pass through the bleed openings and the central passage in the diaphragm and creating a reduced pressure above said diaphragm to lift it and establish communication to said second chamber and, with the solenoid actuated valve in its normal position, suction from said first chamber causes the diaphragm to lift due to reduced pressure above the diaphragm created by the suction applied through the bleed openings.

4. A chemical solution withdrawal and refill system for a solution tank, comprising a control valve, a source of liquid pressure and suction communicating with said valve, an air check valve, and a conduit connecting said valves, said control valve including a first chamber communicating with said source of liquid pressure and suction, a second chamber communicating with said conduit, a third chamber communicating with said first and second chambers, a diaphragm in said third chamber normally preventing communication between said first and second chambers, a solenoid actuated valve controlling actuation of said diaphragm for refilling the system, and a reciprocable flow control member in said second chamber, a limiting wall and a limiting shoulder in said second chamber and spaced apart a distance greater than the length of said flow control member, said reciprocable flow control member including a resilient flow control having a central passage therethrough, and a spider surrounding said flow control and extending beyond one end thereof, whereby said flow control member moving in one direction abuts the limiting wall to limit flow to said central passage, and said flow control member moving in the opposite direction abuts the spider against the limiting shoulder allowing flow around said resilient flow control and through said spider, said air check valve including a valve seat having a passage communicating with said conduit, a cylindrical screen cage surrounding and extending above said valve seat, a screen top integral with said screen cage and having a central opening, and a ball valve in said screen cage which is larger than said opening.

5. A two-way flow control valve for controlling flow to and from a solution tank, comprising a valve body having a pair of spaced chambers, one chamber communicating with a source of liquid pressure and vacuum and the other chamber communicating with a solution tank, an intermediate chamber communicating with said spaced chambers, a diaphragm in said intermediate chamber controlling flow between said spaced chambers and including a web portion and a central area of relatively greater thickness, said web area having at least one bleed opening therein and said central portion having a central passage extending therethrough, a solenoid actuated valve member in said intermediate chamber above said diaphragm which normally closes the central passage, and a reciprocable flow control member located in said chamber communicating with the solution tank and adapted to provide a substantially constant limited flow rate for liquid flow in one direction and a substantially unlimited flow rate in the opposite direction.

6. A two-way flow control valve as set forth in claim 5, in which the bleed openings in the web portion of the diaphragm communicate with the first spaced chamber and the central passage communicates with the other spaced chamber.

7. A two-way flow control valve as set forth in claim 6, in which the diaphragm normally prevents flow when liquid pressure is exerted through the first chamber and the diaphragm is lifted upon actuation of the solenoid and, when vacuum is applied, both the diaphragm and the solenoid actuated valve are lifted without actuation of the solenoid.

8. A two-way flow control valve as set forth in claim 5, in which said reciprocable flow control member includes a resilient flow control having a central passage therethrough and a spider surrounding said flow control and extending beyond one end thereof, such that flow in one direction can only pass through said central passage and flow in the opposite direction can pass around the member through the spider as well as through the central passage.

References Cited in the file of this patent
UNITED STATES PATENTS

| | | |
|---|---|---|
| 1,294,380 | Benson | Feb. 18, 1919 |
| 1,839,962 | Groeniger | Jan. 5, 1932 |
| 1,876,223 | Hagey | Sept. 6, 1932 |
| 2,412,452 | Green | Dec. 10, 1944 |
| 2,591,060 | Garretson | Apr. 1, 1952 |
| 2,691,385 | Budd | Oct. 12, 1954 |
| 2,796,883 | Thompson | June 25, 1957 |
| 2,799,290 | Svirsky | July 16, 1957 |
| 2,816,572 | Pratt | Dec. 17, 1957 |
| 2,906,285 | Rosten et al. | Sept. 29, 1959 |
| 2,922,433 | Techler | Jan. 26, 1960 |
| 2,962,041 | Johnson | Nov. 29, 1960 |
| 2,972,412 | Lundeen | Feb. 21, 1961 |
| 3,003,638 | Kryzer et al. | Oct. 10, 1961 |